Oct. 22, 1963     R. K. TAYLOR     3,107,534
TRAP FOR MERCURY RETENTION
Filed July 13, 1961
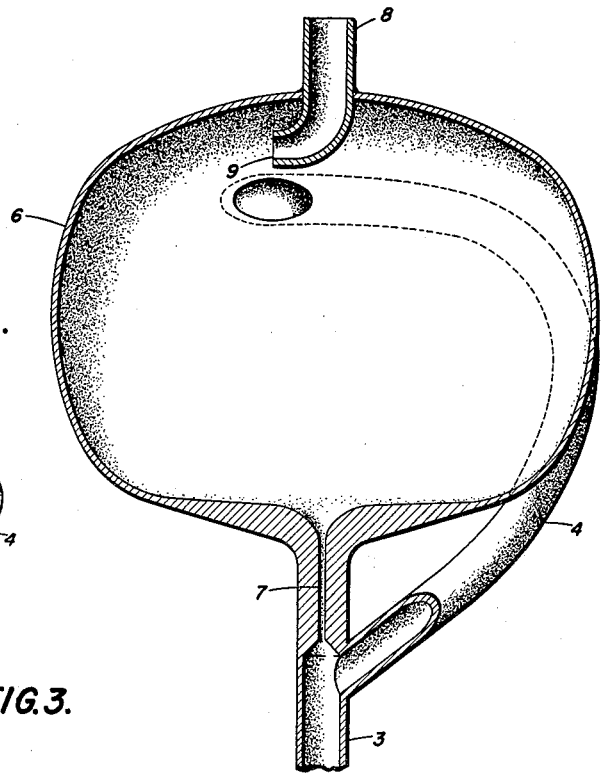
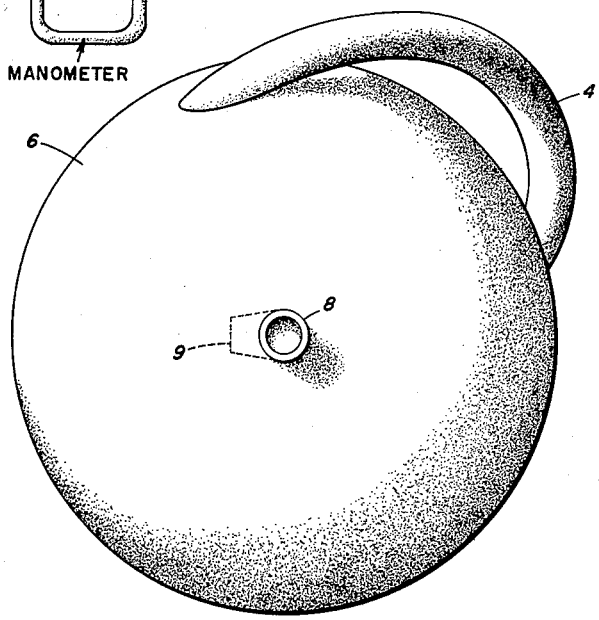
ROGER K. TAYLOR
INVENTOR

# United States Patent Office 3,107,534
Patented Oct. 22, 1963

3,107,534
TRAP FOR MERCURY RETENTION
Roger K. Taylor, Baltimore, Md., assignor to W. R. Grace & Co., New York, N.Y., a corporation of Connecticut
Filed July 13, 1961, Ser. No. 123,905
3 Claims. (Cl. 73—401)

This invention relates to a trap for liquid retention suitable for use with laboratory equipment. In one specific aspect, it relates to a trap for mercury retention to be used with apparatus in which a mercurial manometer is employed as a pressure-measuring device.

Manometric techniques have long been employed for experiments carried on at a laboratory scale. The use of mercurial manometers dates back to the formulation of the gas laws and has proven to be an inexpensive and convenient means of measuring pressure. As well, in the last twenty to thirty years, liquid manometers are proving to be useful not only in the physical chemistry labratory, but also in biochemical studies wherein measurements of oxygen uptake or carbon dioxide release are convenient yardsticks for respiration.

When mercury manometers are used in a system in which pressure is apt to change rapidly, a number of problems are frequently encountered. For example, excess pressure may blow mercury from a manometer, with the result that mercury is often lost and equipment must sometimes be dismantled to restore the status quo. And of course, the results of the particular experiment being run at the time are often ruined.

It is an object, therefore, of this invention, to provide a trap adaptable for use on the open end of a manometer which will prevent the loss of liquid even under sudden pressure change, and return it to the manometer automatically when the pressure subsides.

I have found that the principle of a "cyclone" dust collector can be effectively adapted to the problem at hand. I have devised a bulb having a tangential connection through which the liquid from the manometer is introduced. The bulb is fitted with a hooked gas-exit tube, and a tube for conection to the manometer by way of which the liquid is returned.

My invention is clearly understood when the accompanying drawing is considered, wherein:

FIG. 1 is a longitudinal cross section of the trap;
FIG. 2 is a top view of the trap; and
FIG. 3 is a composite view of the trap inserted in the open end of a manometer.

Inlet tube 3 is made to fit above the low-pressure leg of the manometer. Extending from inlet tube 3 is a large tube 4 connected tangentially to the periphery of bulb 6. A narrow tube 7 provides for the return of liquid to the manometer. As a further precaution against liquid loss, the gas outlet 8 may be provided with a hooked safety tube 9.

A typical operation of the trap used in conjunction with a mercurial manometer is as follows: Upon a sudden burst of pressure from within the manometer, mercury is rapidly ejected. This mercury enters the bulb tangentially and flows around the circumference of the bulb; displaced gas escapes through the central exit. When the pressure subsides, the mercury returns to the manometer by gravity flow. Any small fraction of the mercury blown upward through the return line is deflected by the hook on the exit tube.

Certain obvious modifications are within the scope of my invention. For example, in some instances it may be desirable to filter the liquid before it is allowed to return to the manometer. In these cases, it is a simple matter to install a filtering device in the interior of the bulb so that continuous filtration is automatic.

The shape of the upper part of the bulb is not critical; it may be flattened as shown, or spherical; however, the bottom should be nearly flat. Otherwise, liquid may start to return through the vertical central tube before the excess pressure has been relieved. Under these circumstances the liquid would be broken up into spray by countercurrent gas flow and more easily blown out, as well as interfere with pressure release. With a flat or nearly flat bottom, the swirling motion keeps the liquid at the periphery for a while, out of the way of gas flow. The size of the trap must be commensurate with that of the manometer with which it is to be used.

I claim:

1. A trap and liquid manometer combination comprising a liquid manometer having one open arm, a spheroidal body, a liquid return leading axially from the bottom of said spheroid to the open end of said manometer, means restricting the flow of liquid through said return line, a bypass leading from said liquid return line below said restriction and entering said spheroid tangentially at its periphery, and a gas exit tube leading axially upwardly from said spheroid, said exit tube having an intake in said body directed away from its axis.

2. A device for liquid retention for use in combination with a liquid manometer which comprises a liquid manometer having one open end and a hollow bulb attached to the open end of said manometer, said bulb having a narrow return tube extending downwardly from its bottom surface and connecting with a tube of larger diameter by which the bulb is attached to said manometer, a tube tangentially connected with said bulb and extending around its outer surface to connect with said tube of larger diameter by which liquid thrown out of said manometer is conducted into said bulb.

3. A trap and liquid manometer combination comprising a liquid manometer having one open end, a hollow body having a circular periphery, a constricted liquid return line leading from a lower portion of said body to a tube of larger diameter which is connected to the open end of said manometer, a line entering said body tangentially and extending around its circular periphery ultimately connecting with said tube of larger diameter, and an outlet axially positioned in an upper portion of said body having an intake directed away from said liquid return line below.

References Cited in the file of this patent
UNITED STATES PATENTS

| | | |
|---|---|---|
| 1,983,297 | Lawrence | Dec. 4, 1934 |
| 2,946,475 | Rockelman | July 26, 1960 |
| 3,048,039 | Hackler | Aug. 7, 1962 |

FOREIGN PATENTS

| | | |
|---|---|---|
| 817,969 | Germany | Oct. 22, 1951 |